(12) United States Patent
Beye

(10) Patent No.: US 12,339,925 B2
(45) Date of Patent: Jun. 24, 2025

(54) DATA ANALYSIS APPARATUS, METHOD, AND COMPUTER READABLE METHOD

(71) Applicant: NEC Corporation, Tokyo (JP)

(72) Inventor: Florian Beye, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1058 days.

(21) Appl. No.: 17/299,044

(22) PCT Filed: Dec. 7, 2018

(86) PCT No.: PCT/JP2018/046226
§ 371 (c)(1),
(2) Date: Jun. 2, 2021

(87) PCT Pub. No.: WO2020/115919
PCT Pub. Date: Jun. 11, 2020

(65) Prior Publication Data
US 2022/0043888 A1 Feb. 10, 2022

(51) Int. Cl.
*G06F 17/18* (2006.01)

(52) U.S. Cl.
CPC .................. *G06F 17/18* (2013.01)

(58) Field of Classification Search
CPC ....................................... G06F 17/18
See application file for complete search history.

(56) References Cited

U.S. PATENT DOCUMENTS

| 9,418,339 B1* | 8/2016 | Leonard ............. G06N 5/022 |
| 2003/0078924 A1 | 4/2003 | Liechty et al. |
| 2013/0262013 A1 | 10/2013 | Ide |
| 2017/0270413 A1 | 9/2017 | Moreira-Matias et al. |
| 2019/0018933 A1* | 1/2019 | Oono ................. G06N 3/045 |

FOREIGN PATENT DOCUMENTS

JP 2018-190251 A 11/2018

OTHER PUBLICATIONS

JP Office Action for JP Application No. 2021-554426, mailed on Aug. 30, 2022 with English Translation.
International Search Report of PCT Application No. PCT/JP2018/046226 mailed Aug. 2, 2019.

* cited by examiner

*Primary Examiner* — Michael D. Yaary
(74) *Attorney, Agent, or Firm* — Sughrue Mion, PLLC

(57) ABSTRACT

The present disclosure provides a data analysis apparatus including a time series analysis state memory unit configured to store a state of a time series data analysis; a time series analysis unit configured to analyze input data points belonging to time series data generated by a plurality of data sources and update the state stored the time series analysis state memory unit; and a filtering apparatus including: a data fetching unit configured to fetch data points from the data sources; a quality target memory unit; and a data point selection optimization unit configured to select data points based on a quality target stored in the quality target memory unit and data input from the time series analysis state memory unit.

1 Claim, 6 Drawing Sheets

| Time Slice | Data Source 1 | Data Source 2 | Data Source 3 | ... |
|---|---|---|---|---|
| 0 | Selected | | | |
| 1 | | Selected | Selected | |
| 2 | | | | |
| 3 | | Selected | | |
| 4 | Selected | | | |
| 5 | | | | |
| 6 | Selected | Selected | | |
| 7 | | | Selected | |
| 8 | | Selected | | |

DATA ANALYSIS APPARATUS, METHOD, AND COMPUTER READABLE METHOD

This application is a National Stage Entry of PCT/JP2018/046226 filed on Dec. 7, 2018, the contents of all of which are incorporated herein by reference, in their entirety.

TECHNICAL FIELD

The present invention relates to a method for selecting data to be input into a time series analysis.

BACKGROUND ART

Applications analyzing time series data streams from a variety sources incur potentially high computation, network transmission costs, or both, when the number of data sources is large, the amount of required computation/transmission for a single point of data in the stream is large, or both.

Therefore, technologies reducing the amount of computation/transmission are desirable. Existing methods such as data compression, while reducing transmission cost, require processing of actual data and do not throw away unnecessary data early by inspecting meta-data such as timestamps or data source IDs (identifiers) only. This is because these methods do not consider what data points are necessary or unnecessary to maintain the quality of the time series analysis at a desired level.

Existing methods such as the one disclosed in Patent Citation 1 perform a selection of data sources based on a priority score. Although this allows filtering away data by inspecting meta-data only, the existing method has the following drawbacks: it requires periodic analysis of all data streams to determine priority scores. When actual data stream priority changes frequently, i.e., close to the level of individual data points, the overhead of priority score analysis outweighs the positive effects of data filtering. It always selects a fixed number of data streams, and there is no way to adapt the number of selected data streams or to adapt data rates. Therefore, such a method cannot adapt optimally to maintain time series analysis quality at a desired level while minimizing the number of selected data points.

CITATION LIST

[Patent Citation 1]
  US 2017/0270413

DISCLOSURE OF INVENTION

Technical Problem

As mentioned above, applications analyzing time series data streams from a variety sources incur potentially high computation, network transmission costs, or both, when the number of data sources is large, the amount of required computation/transmission for a single point of data in the stream is large, or both.

Technical Solution

The present disclosure addresses the problem of computational overhead of methods disclosed in the prior art while keeping data analysis quality at a desired level.

The present disclosure further provides a data analysis apparatus employing filtering that reduces the computational overhead required for filtering data as compared to the prior art and that maintains the quality of time series analysis at a desired level.

The filtering employed by the embodiments of this disclosure selects individual data points based on the internal state of the time series analysis. Furthermore, in an embodiment, data points are selected by solving an optimization problem involving a quality target.

More specifically, a first exemplary aspect of the present disclosure provides a data analysis apparatus including a time series analysis state memory unit configured to store a state of a time series data analysis; a time series analysis unit configured to analyze input data points belonging to time series data generated by a plurality of data sources and update the state stored the time series analysis state memory unit; and a filtering apparatus including: a data fetching unit configured to fetch data points from the data sources; a quality target memory unit; and a data point selection optimization unit configured to select data points based on a quality target stored in the quality target memory unit and data input from the time series analysis state memory unit.

As a second exemplary aspect of the present disclosure, a data analysis method is provided including: calculating an entropy value of a probability distribution associated with a state of a stochastic time series model; calculating an expression comprising entropies and conditional entropies of probability distributions associated with the state of a stochastic time series model for each data source; ranking the calculated expressions; and selecting data sources in an order of the ranking of the calculated expressions such that a sum of the calculated entropy value with a sum of the calculated expressions associated with the selected data sources is closest to a target value.

As a third exemplary aspect of the present disclosure, a non-transitory computer readable storage medium is provided containing instructions to cause a computer to execute: calculating an entropy value of a probability distribution associated with a state of a stochastic time series model; calculating an expression comprising entropies and conditional entropies of probability distributions associated with the state of a stochastic time series model for each data source; ranking the calculated expressions; and selecting data sources in an order of the ranking of the calculated expressions such that a sum of the calculated entropy value with a sum of the calculated expressions associated with the selected data sources is closest to a target value.

Advantageous Effects

The filtering employed in the present disclosure does not require separate data analyses such as methods disclosed in the prior art, because it selects individual data points based on an internal state of the time series analysis, hence reducing the computational overhead, ultimately saving time, power consumption, cost, and the like, over the techniques of the prior art. Furthermore, it can maintain the quality of the time series analysis at a desired level while minimizing the amount of required data points because data points are selected by solving an optimization problem involving a quality target.

BEST MODE FOR CARRYING OUT THE INVENTION

Example Embodiments

Figure 1:
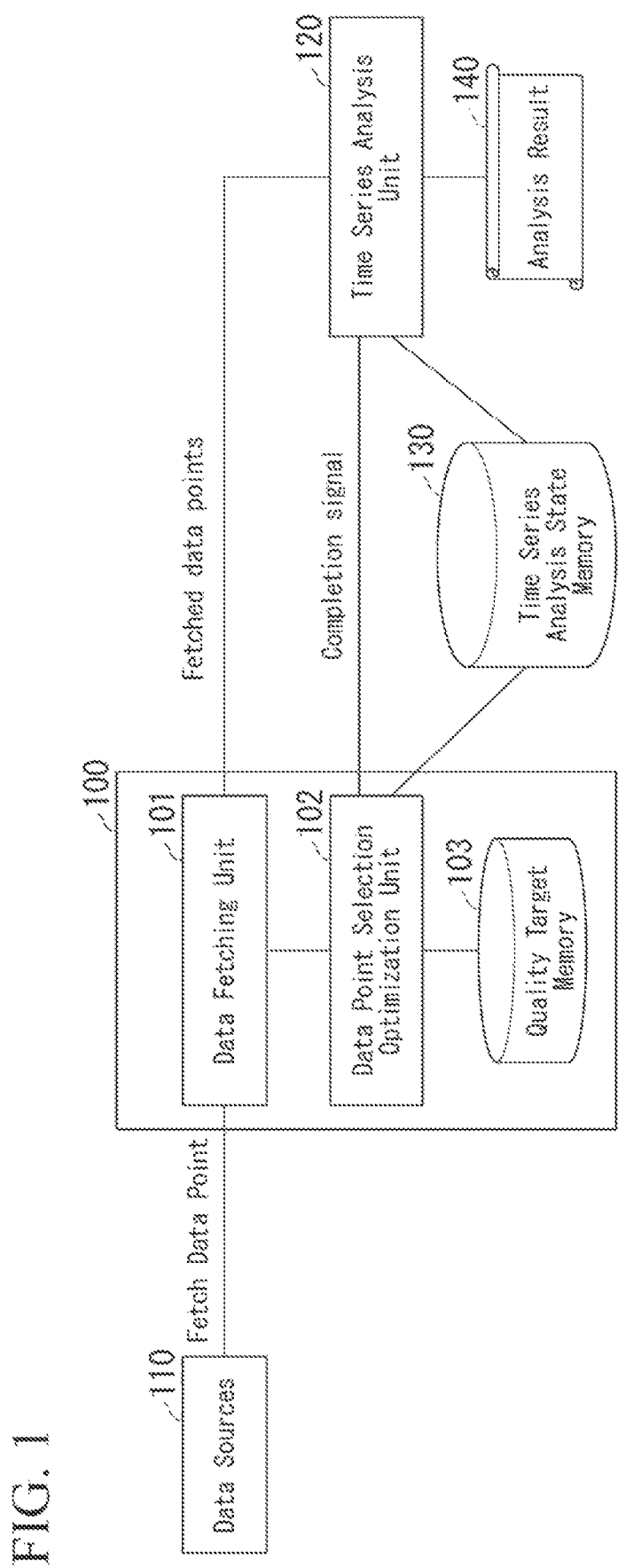
FIG. 1 illustrates a block diagram showing the structure of a first example embodiment of the present disclosure.

Example embodiments of the present invention are described in detail below referring to the accompanying drawings. In the drawings, the same elements are denoted by the same reference numerals, and thus redundant descriptions are omitted as needed.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations, sub-combinations, or both, in one or more embodiments or examples.

First Example Embodiment

For clarity in the following description, several terms will be defined here to facilitate easy comprehension of embodiments of the present disclosure. Time is broken down into slices (time slices) of fixed duration, i.e., discrete time. A "data source" refers to an entity that can provide at least a single data point for a plurality of time slices, preferably each of a plurality of time slices. In total, the number of available data sources is assumed to be N. A "data point" is assumed to be a tuple of (t, n, d), where t identifies a time slice, n identifies a data source, and d denotes the data content associated with the data point. A 'data point definition' is assumed to be a tuple (t,n), where t identifies a time slice, and n identifies a data source.

Hereinafter, a structural configuration of a first example embodiment of the present disclosure, i.e., a data analysis apparatus, is described with reference to FIG. 1. In the following, each functional unit of this example embodiment will be described individually, however, such description should not be considered as limiting functions to separate physical units, and hardware units may perform some or all functions in a single unit, for example, depending on design specifications.

In this first example embodiment, a filtering apparatus 100 receives a completion signal from a time series analysis unit 120, determines data point definitions based on data input from a time series analysis state memory 130, fetches data points according to determined data point definitions from data sources 110, and sends fetched data points to the time series analysis unit 120.

A data fetching unit 101 receives data point definitions from the data point selection optimization unit 102, fetches data points according to the determined data point definitions from data sources 110, and sends fetched data points to the time series analysis unit 120.

Figures 3, 4:
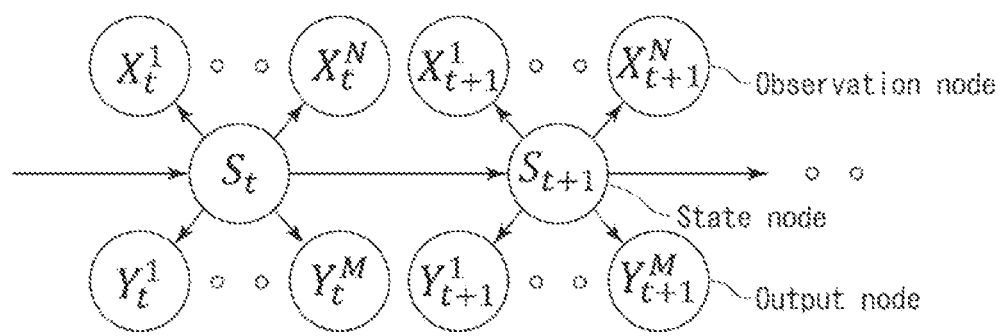
FIG. 3 shows an example of a history of selected data points that could result from an operation of the first example embodiment of the present disclosure.
FIG. 4 illustrates an exemplary structure a stochastic time series model.

A data point selection optimization unit 102 receives a completion signal from the time series analysis unit 120, inputs data from a time series analysis state memory 130 corresponding to the current state of the time series analysis at a time slice t, inputs a quality level value from a quality target memory 103 and determines, based on the data input from the time series analysis state memory 130 and the input quality level value, a set of data point definitions of the form (t+1,n) (or possibly an empty set), n identifying the data source and t+1 corresponding to the next time slice. The set of data point definitions is determined in an optimized way such that only as many data points as required to keep the quality of the output analysis results 140 close to the quality level specified by the content of the quality target memory 103 are fetched from the data sources 110. As the operation of this unit as described above is repeated each time a completion signal arrives from the time series analysis unit 120, in effect, a history of sets of data point definitions is produced. An example execution could for example produce a history such as the one represented in FIG. 3.

The quality target memory 130 contains a quality level value controlling the data point selection performed by the data point selection optimization unit 102. The quality level value corresponds to a targeted average quality level of the output analysis results 140.

The data sources 110 allow querying data points from the data sources. Receives queries from the filtering apparatus 100 containing a data point definition (t, n) and responds with a data point (t, n, d) or a data non-availability message. Preparing data d for the response may, for example, incur network transmission overhead, additional computation overhead, or both, due to data preprocessing.

The time series analysis unit 120 inputs data points from the filtering apparatus 100, updates the content of the time series analysis state memory 130 according to the input data points and the current content of the time series analysis state memory 130, outputs an analysis result 140, and sends a completion signal to the filtering apparatus 100. The procedure for updating the time series analysis state memory 130 may also provide the function of incrementing the time slice identifier stored in the time series analysis state memory 130.

The time series analysis state memory 130 stores a time slice identifier t and the state of the time series analysis for the time slice identified by t. The state of the time series analysis is assumed to contain information enough for predicting, to some extent, the quality of the output analysis results.

The analysis result 140 is a document containing the analysis results. It is periodically output by the time series analysis unit 120.

Figure 2:
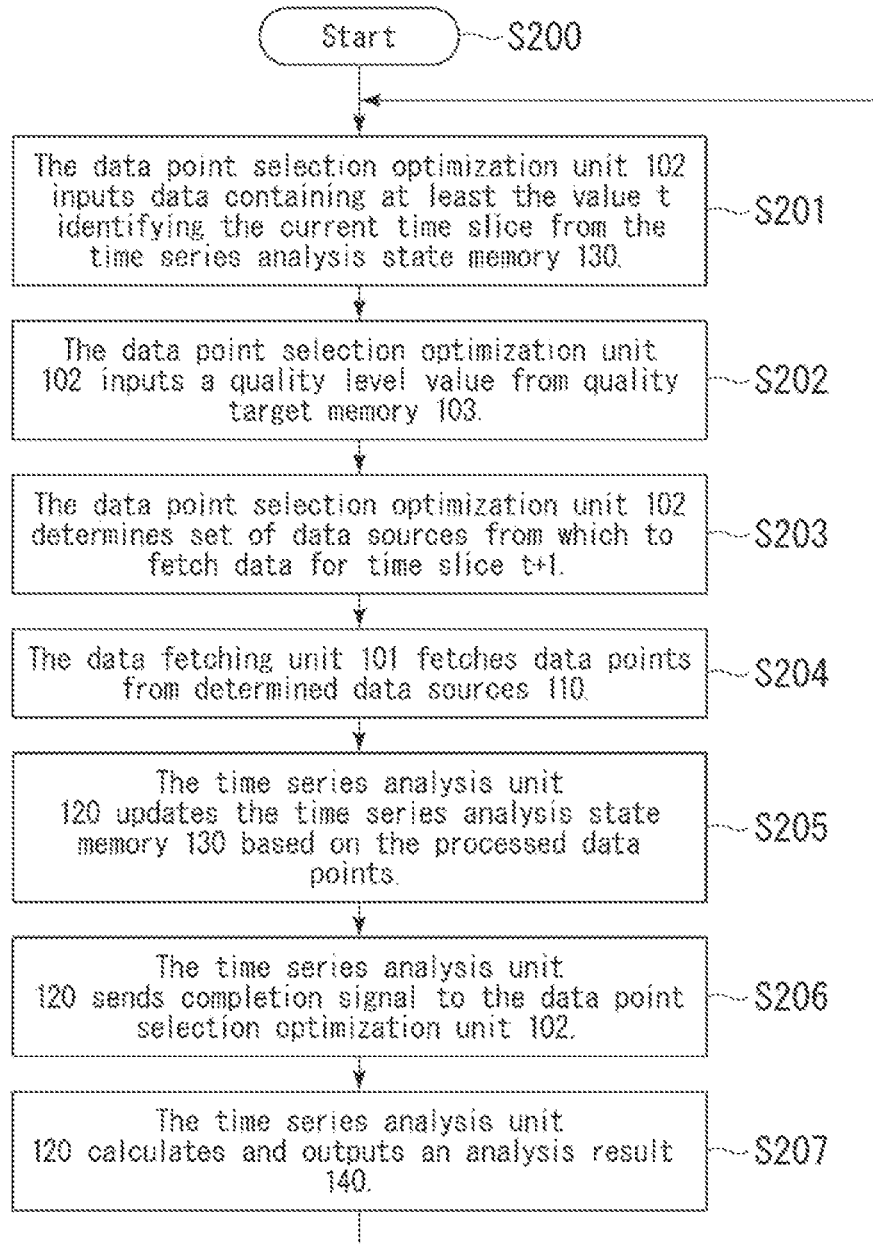
FIG. 2 provides a flow diagram showing the operation of the first example embodiment of the present disclosure.

In the following, the operation of the apparatus depicted in FIG. 1 is explained according to process steps in the flow diagram of FIG. 2.

In step S200, the data analysis apparatus starts operation. In this example, the time series analysis state memory 130 contains data for time slice t=0, and that the time slice identifier stored in the time series analysis state memory 130 is set to t=0 when operation initiates.

In step S201, after the data analysis apparatus starts operation or after reception of a completion signal from the time series analysis unit 120, the data point selection optimization unit 102 inputs data from the time series analysis state memory 130 containing at least the time slice identifier t stored in the time series analysis state memory 130.

In step S202, the data point selection optimization unit 102 inputs a quality level value from the time series analysis state memory 103.

In step S203, using the data input from the time series analysis state memory 130 and the input quality level value, the data point selection optimization unit 102 selects a set U of data sources $\{n\_1, \ldots, n\_k\}$ that is a subset of the set of all data sources $\{1, \ldots, N\}$. The data point selection optimization unit 102 then sends a set V of data point definitions, $V=\{(t+1,n)$ for n in $U\}$, to the data fetching unit 101.

In step S204, the data fetching unit 101 receives a set V of data point definitions. Then, for each (t, n) in V, the data fetching unit 101 fetches the data point corresponding to time t and data source n from the data sources 110. The data sources 110 may respond with a data point corresponding to time t for all data sources, however, may alternatively respond instead with a non-availability message (e.g. due to unavailability from buffer drops or for other reasons). Hence, the data fetching unit 101 obtains a set W of data points, $W=\{(t, n, d)$ for all data source n that responded with a data point$\}$. Finally, the data fetching unit 101 sends the set of fetched data points W to the time series analysis unit 120.

In step S205, the time series analysis unit 120 receives a set of data points W from the filtering apparatus 100, and then updates the content of the time series analysis state memory 130 based on W. This update procedure may also include a function of incrementing the time slice identifier stored in the time series analysis state memory 130.

In step S207, after updating the time series analysis state memory 130, the time series analysis unit 120 sends a completion signal to the data point selection optimization unit 102, signaling that the update of the time series analysis state memory 130 has completed.

In step S208, after sending the completion signal, the time series analysis unit 120 calculates and outputs an analysis result 140.

After finishing the step S208, operation continues at the step S201.

It should be noted that the effect of the filtering apparatus 100 in this embodiment is that by optimally choosing the data sources from which to query data points for each time step based on the current state of the time analysis, it is possible to keep the quality of the output analysis results close to a specified level, while minimizing the number of data point queries (which may incur significant network transmission, computation overhead, or both). This is possible because the time series analysis contains information from which the quality of output analysis results can be predicted.

Second Example Embodiment

The second embodiment shares some similarities with the first embodiment and like components share the same reference numbers. Hereinbelow, differences between first and second example embodiments will be described while redundant descriptions of components shared with the first example embodiment will be omitted.

This embodiment makes use of a stochastic time series model. Such a model may for example be a graphical model of a structure such as (but not limited to) the one depicted in FIG. 4. The model consists of a Markov chain of random variables $S\_t$ (state nodes) belonging to a state space, where t identifies a time slice. The $S\_t$ are independent when conditioned on $S\_\{t-1\}$. Furthermore, the model contains N random variables $X^1\_t \ldots X^N\_t$ (observation nodes) for each time slice. The $X^1\_t \ldots X^N\_t$ are independent when conditioned on $S\_t$. Observation nodes correspond one-to-one to data point definitions and they take values in the space of data configurations that a data content d belonging to data point definition (t, n) may belong to. Furthermore, the model contains M random variables $Y^1\_t \ldots Y^M\_t$ that are independent when conditioned on the $S\_t$. For example, as a special case, M=1 and $Y^1\_t=S\_t$.

The structure of the second embodiment of this invention is identical to that of the first embodiment which is displayed in the block diagram in FIG. 1. The functionality of each unit is further amended as follows:

The state of the time series analysis for the time slice identified by t includes (but is not limited to) the following:
  i) a probability distribution $P\_1(s)$, representing the probability of the random variable $S\_t$ having a value $S\_t=s$, given the data previously input in to the stochastic time series analysis unit 130,
  ii) a probability distribution $P\_1'(s)$, representing the probability of the random variable $S\_\{t+1\}$ having value $S\_\{t+1\}=s$, given the data previously input in to the stochastic time series analysis state memory 130,
  iii) probability distributions $P\_2(s|s')$, representing the probability of random variable $S\_\{t+1\}$ having value $S\_\{t+1\}=s$ when conditioned on the random variable $S\_t$ having value $S\_t=s'$, given the data previously input in to the stochastic time series analysis state memory 130,
  iv) probability distributions $P\_3(x^n|s)$, representing the probability of random variable $X^n\_t$ having value $X^n\_t=x^n$ when conditioned on the random variable $S\_t$ having value $S\_t=s$, given the data previously input in to the stochastic time series analysis state memory 130,
  v) probability distributions $P\_4(y^m|s)$, representing the probability of random variable $Y^m\_t$ having value $Y^m\_t=y^m$ when conditioned on the random variable $S\_t$ having value $S\_t=s$, given the data previously input in to stochastic time series analysis state memory 130, and
  vi) the value of t identifying the current time slice.

The analysis result 140 may include, for example, the predicted distributions of the random variables $Y^m\_t$ (for current, future time slices t, or both), or derived quantities such as expectance values of functions $f(y^m)$, that can be calculated using $P\_1(s)$ and $P\_4(y^m|s)$ stored in the time series analysis state memory 130.

The operation of the second embodiment the same as that of the first embodiment, except for the following difference.

In the step S205, the update procedure further includes, for example, updating the probability distribution $P\_1(s)$, representing the probability of the random variable $S\_t$ having value $S\_t=s$ by using Bayesian inference, and further updating the probability distribution $P\_1'(s)$ as $P\_1'(s)=$integral$\_ds' P\_1(s') P\_2(s|s')$.

Third Example Embodiment

Figure 5:
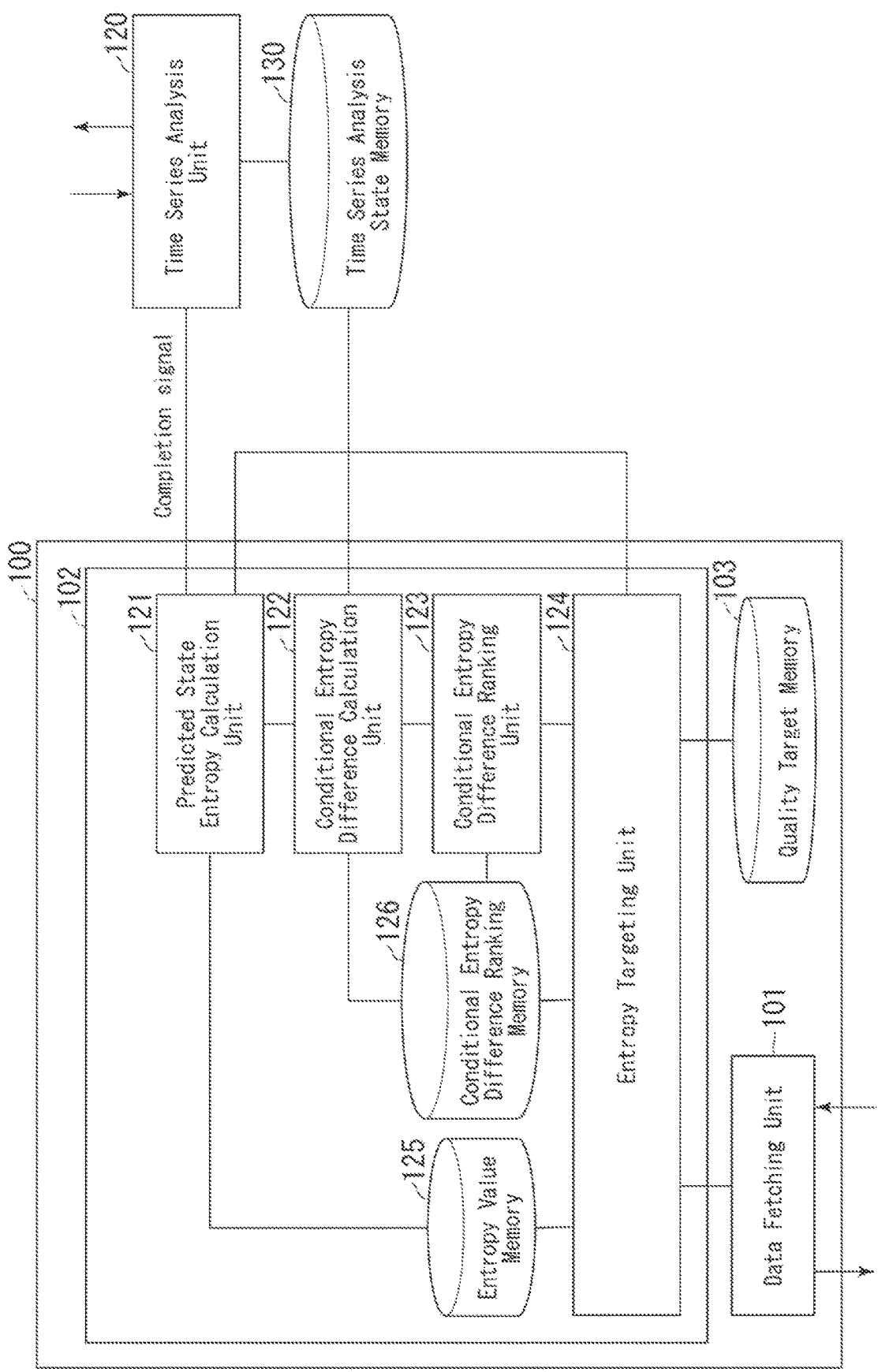
FIG. 5 illustrates a block diagram showing the structure of the second embodiment of the present disclosure.

The third embodiment shares some similarities with the second embodiment and like components share the same reference numbers. Hereinbelow, differences between second and third example embodiments will be described while redundant descriptions of components shared with the first and second example embodiments will be omitted. In comparison with the second embodiment, the third embodiment specializes the function of the data point selection optimization unit 102 as shown in FIG. 5. Below, the functionality of each unit added with this embodiment is explained.

A predicted state entropy calculation unit 121 receives a completion signal from the time series analysis unit 120, calculates the entropy value H of the distribution P_1'(s) that is stored in the time series analysis state memory 130, writes the calculated entropy to the entropy value memory 125, and sends a completion signal to the conditional entropy difference calculation unit 122.

A conditional entropy difference calculation unit 122 receives a completion signal from the predicted state entropy calculation unit 121, calculates for each n the entropy value A_n of the marginal distribution P'(x^n)=integral_ds P_1'(s) P_3(x^n|s), calculates the conditional entropy value B_n of distribution P_3(x^n|s), calculates the differences H_n=A_n−B_n, stores the tuples (n, H_n) to the conditional entropy difference ranking memory 126, and sends a completion signal to the conditional entropy difference ranking unit 123.

A conditional entropy difference ranking unit 123 receives a completion signal from the conditional entropy difference calculation unit 122, sorts the entries (n, H_n) in the conditional entropy difference ranking memory 126 with respect to H_n in decreasing order and outputs a completion signal to the entropy target unit 124. The sorting is performed such the k-th entry is denoted by (n_k, H_{n_k}), and H_{n_{k+1}} is less or equal to H_{n_k}.

An entropy targeting unit 124 receives a completion signal from the conditional entropy difference ranking unit 123, inputs time slice identifier from the time series analysis state memory 130, inputs a entropy target value H* from the time series analysis state memory 130, an entropy value H from the entropy value memory 125 and sorted tuples (n_k, H_{n_k}) from the conditional entropy difference ranking memory 126. Furthermore, this unit determines k from {0, . . . , N} such that |H−sum_{k'=1}^k H_{n_k'}−H*| is minimal, and sends a set V of data point definitions, V={ (t+1, n_k') for k' in {1, . . . , k}}, to the data fetching unit 101.

An entropy value memory 125 stores an entropy value H.

A conditional entropy difference ranking memory 126 stores a list of tuples (n, H_n).

A quality target memory 103 stores an entropy target value H* that expresses the desired (time-)average entropy of the state distribution P_1(s) stored in the time series analysis state memory 130.

Figure 6:
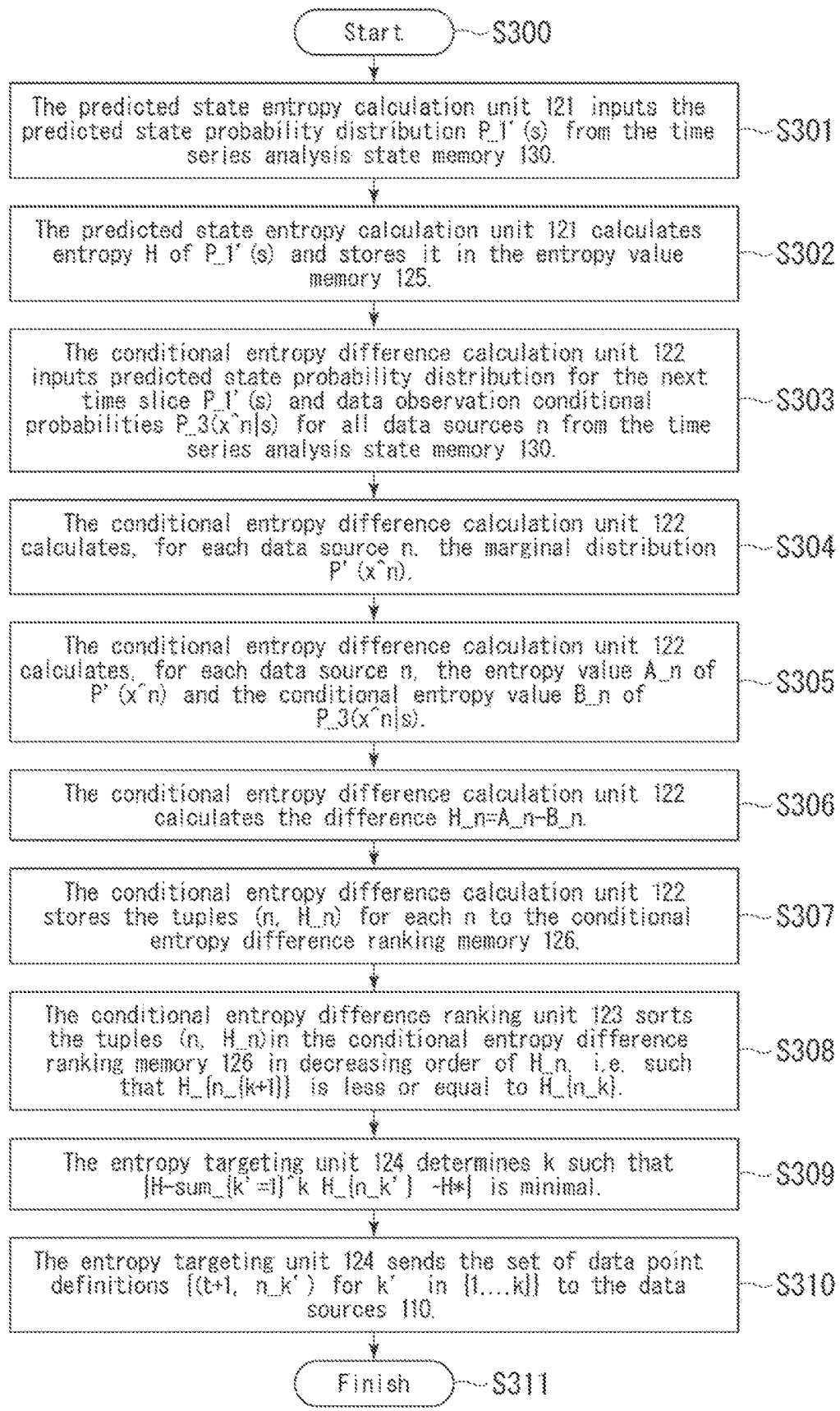
FIG. 6 illustrates a flow diagram showing the operation of the second embodiment of the present disclosure.

In the following, the operation of the data point selection unit 102 is explained according to the flow diagram of FIG. 6.

In step S300, the data point selection unit 102 starts operation after reception of a completion signal from the time series analysis unit 120, or after initiation of operation of the data analysis apparatus as described in the first embodiment.

In step S301, the predicted state entropy calculation unit 121 inputs the predicted state probability distribution P_1'(s) from the time series analysis state memory 130.

In step S302, the predicted state entropy calculation unit 121 calculates (exactly or approximately) the entropy H of the input distribution P_1'(s), and stores the calculated value H in the entropy value memory 125. Then, the predicted state entropy calculation unit 121 sends a completion signal to the conditional entropy difference calculation unit 122.

In step S303, after the conditional entropy difference calculation unit 122 receives the completion signal sent by the predicted state entropy calculation unit 121, it inputs the predicted state probability distribution P_1'(s), and the data observation conditional probabilities P_3(x^n|s) for all data sources n in {1, . . . , N}.

In step S304, the conditional entropy difference calculation unit 122 calculates (exactly or approximately) the marginal distribution P'(x^n)=integral_ds P_1'(s) P_3(x^n|s) for each data source n.

In step S305, the conditional entropy difference calculation unit 122 calculates (exactly or approximately), for each data source n, the entropy A_n of the distribution P'(x_n) and the conditional entropy value B_n of P_3(x^n|s).

In step S306, the conditional entropy difference calculation unit 122 calculates the difference of the calculated values H_n=A_n−B_n.

In step S307, the conditional entropy difference calculation unit 122 stores the tuples (n, H_n) for n in {1, . . . , N} to the conditional entropy difference ranking memory 126, and sends a completion signal to the conditional entropy difference ranking unit 123.

In step S308, after the conditional entropy difference ranking unit 123 receives the completion signal sent from the conditional entropy difference calculation unit 122, it sorts the tuples (n, H_n) stored in the conditional entropy difference ranking memory 126 by the value of H_n in decreasing order, such that the for k-th entry (n_k, H_{n_k}) it follows that H_{n_{k+1}} is less or equal to H_{n_k}. Then the conditional entropy difference ranking unit 123 sends a completion signal to the entropy target unit 124.

In step S309, after the entropy target unit 124 receives the completion signal sent from the conditional entropy difference ranking unit 123, it inputs the tuples (n_k, H_{n_k}) from the conditional entropy difference ranking memory 126, and the entropy value H from the entropy value memory 125, and the entropy target value H* from the quality target memory 103. Then, it determines the value k minimizing the following function: f_k=|H−sum_{k'=1}^k H_{n_k'}−H*|. Furthermore, the entropy target unit 124 inputs the value t identifying the current time slice from the time series analysis state memory 130.

In step S310, the entropy target unit 124 sends the set of data point definitions {(t+1, n_k') for k' in {1, . . . , k}} to the data fetching unit 101.

In step S311, the data point selection optimization unit 102 finishes operation awaiting reception of another completion signal from the time series analysis unit 120.

It should be noted that the data selection method implemented by this embodiment following rationales: (i) reducing the entropy (disorder) of state probabilities P_1(s) increases the quality of the time series analysis, (ii) the conditional entropies H(S_t|X_t^{n_1}, . . . X_t^{n_k}) represent the average (expected) entropy of the state probabilities P_1(s) when data sources {n_1, . . . , n_k} are selected, and (iii) the conditional entropies are difficult to evaluate but can be approximated by H−sum_{k'=1}^k H_{n_k'} as calculated by the method disclosed in this embodiment.

Figure 7:
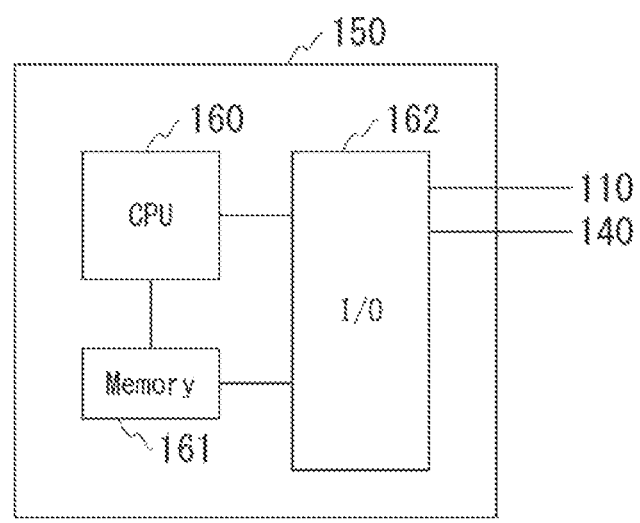
FIG. 7 illustrates general purpose computer hardware on which a software implementation of embodiments of the present disclosure may be run.

Furthermore, example embodiments in accordance with the present example embodiments may be implemented as an apparatus, a device, a method, or a computer program product. Accordingly, the present example embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present example embodiments may take the form of a computer program product embodied in any tangible medium of expression having computer-usable program code embodied in the medium. For example, all of the functions performed by the individual hardware units of the example embodiments may be performed in software on a general purpose computer having a basic structure as that shown in FIG. 7, wherein instructions may be stored in memory 161 and processed by a CPU 160, and wherein the computer may communicate with data sources 110 via an I/O unit 162 in order to output an analysis result 140.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

INDUSTRIAL APPLICABILITY

The disclosed invention can be applied to analyzing time series data from multiple data sources, for example, image data streams generated from multiple cameras.

REFERENCE SIGNS LIST

100 Filtering Apparatus
101 Data Fetching Unit
102 Data Point Selection Optimization Unit
103 Quality Target Memory
110 Data Sources
120 Time Series Analysis Unit
121 Predicted State Entropy Calculation Unit
122 Conditional Entropy Difference Calculation Unit
123 Conditional Entropy Difference Ranking Unit
124 Entropy Target Unit
125 Entropy Value Memory
126 Conditional Entropy Difference Ranking Memory
130 Time Series Analysis State Memory
140 Analysis Results
150 Computer
160 CPU
161 Memory
162 I/O Unit

What is claimed is:
1. A data analysis apparatus comprising:
a first memory configured to store first instructions;
a first processor configured to execute the first instructions; and:
a filtering apparatus including a second memory storing second instructions and a second processor configured to execute the second instructions,
wherein the second processor is configured to execute the second instructions to:
  fetch a plurality of data points from a plurality of data sources;
  store the plurality of data points in the second memory; and
select data points among the plurality of data points based on a quality target stored in the second memory and a state of a time series data analysis stored in the first memory,
wherein the first memory stores probability distributions representing a determination as to a current state of a stochastic time series model based on previously input data points belonging to the time series data, and
  wherein the first processor is configured to execute the first instructions to:
    acquire a state of a time series data analysis of the selected data point by analyzing the selected data point;
    update the state of the time series data analysis stored in the first memory by using the acquired state of the time series data analysis; and
    update the probability distributions according to the input time series data by Bayesian inference, and
  wherein the second processor is further configured to execute the second instructions to:
    calculate a first entropy, wherein the first entropy is an entropy value of a probability distribution associated with the current state of the stochastic time series model stored in the first memory;
    calculate second entropies and third entropies, wherein the second entropies and the third entropies are entropies and conditional entropies of probability distributions associated with the state of the stochastic time series model stored in the first memory for each data source;
    calculate differences between the second entropies and the third entropies for each data source;
    sort the differences based on values of the differences;
    select, in order of the value of the differences, one or more differences among the sorted differences; and
    determine a number of one or more selected differences so that a difference between the first entropy and a sum of the one or more selected differences is closest to a target value.

* * * * *